Figure 9:
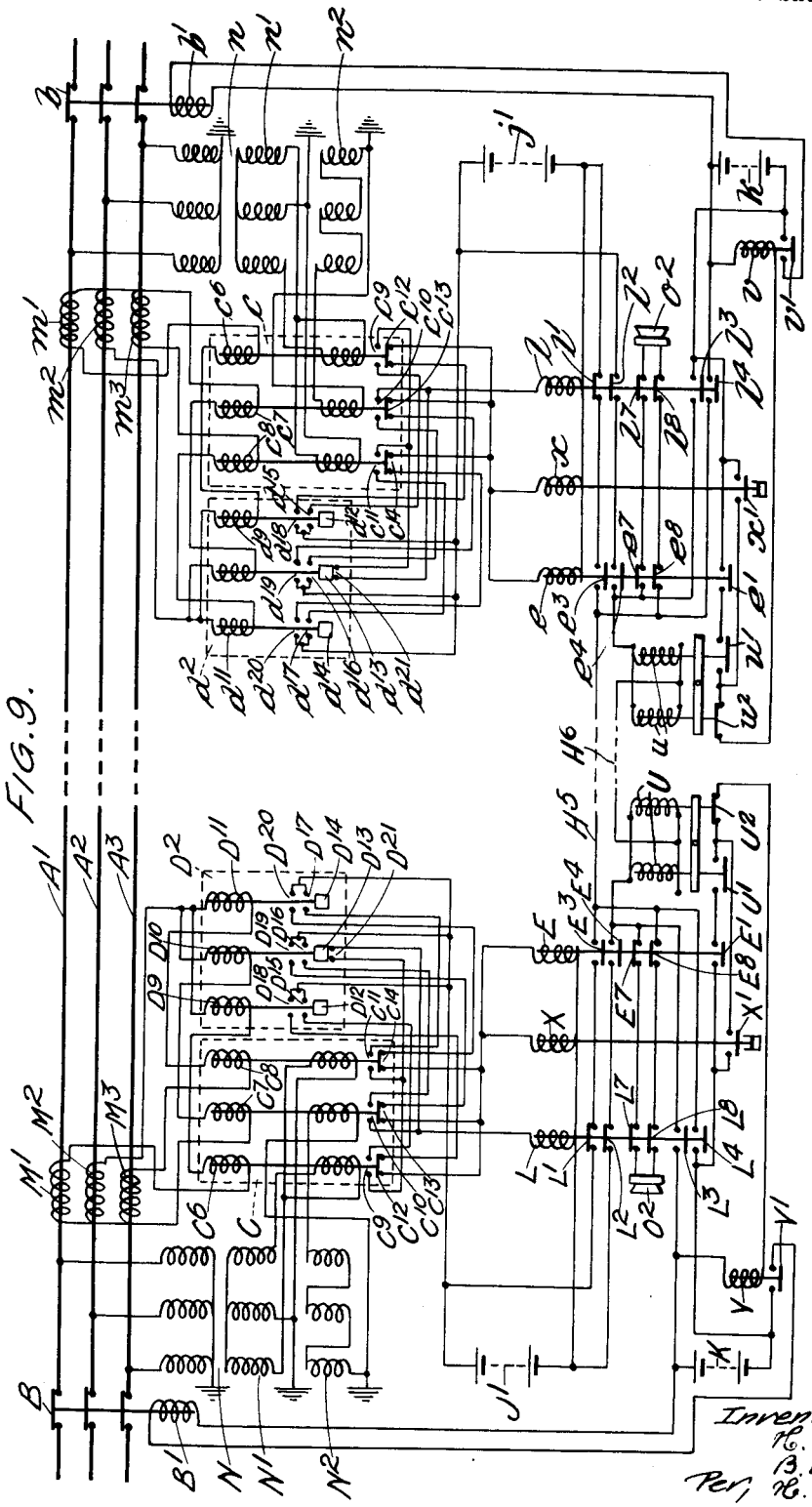

July 18, 1933. H. W. CLOTHIER ET AL 1,919,092
PROTECTIVE ARRANGEMENT FOR SECTIONALIZED ELECTRIC POWER CIRCUITS
Filed Sept. 30, 1932  6 Sheets-Sheet 1
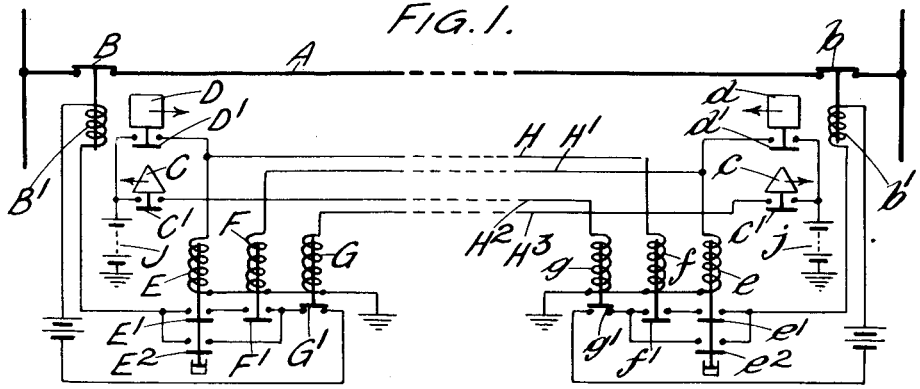
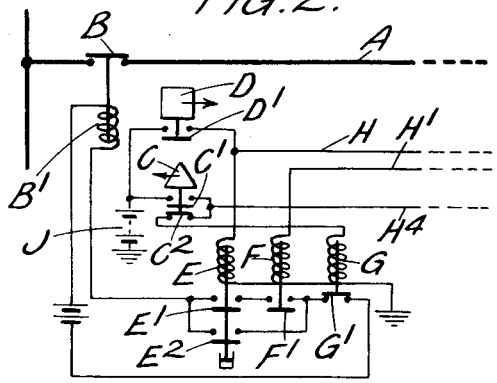
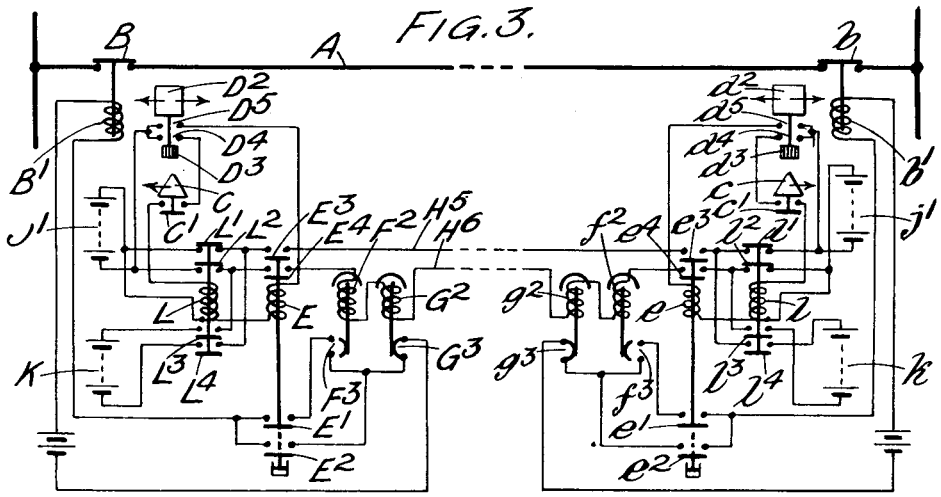

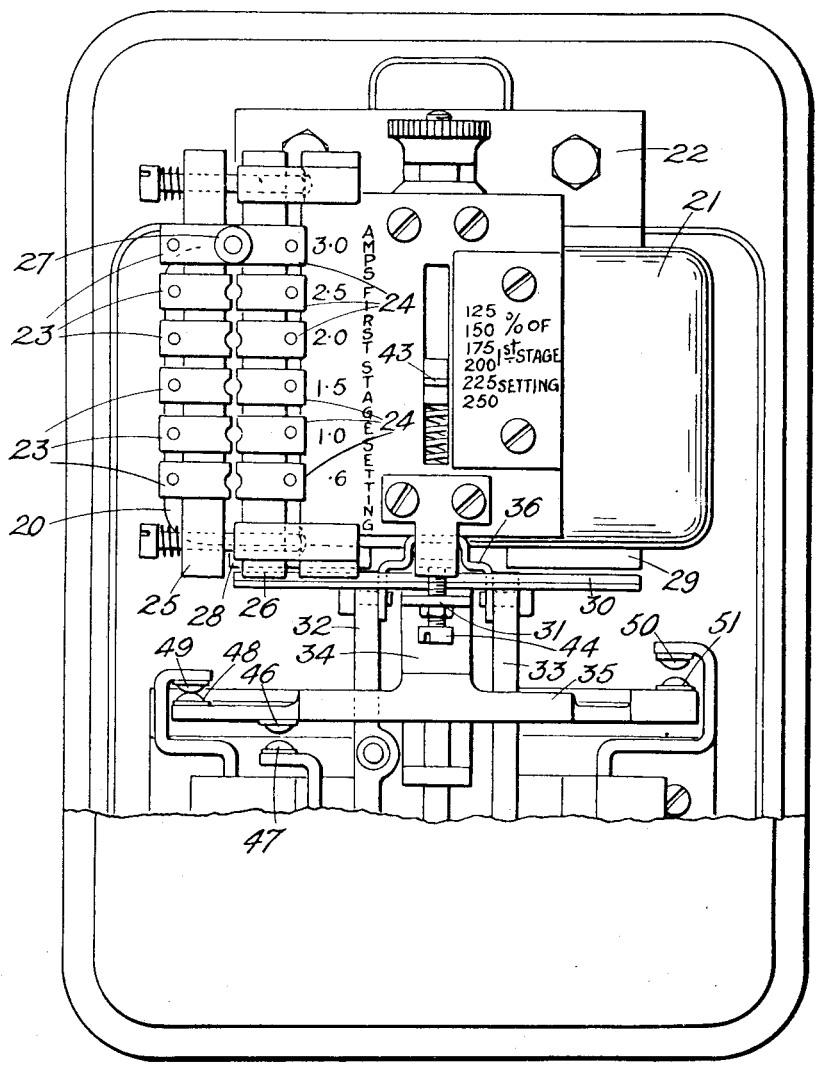

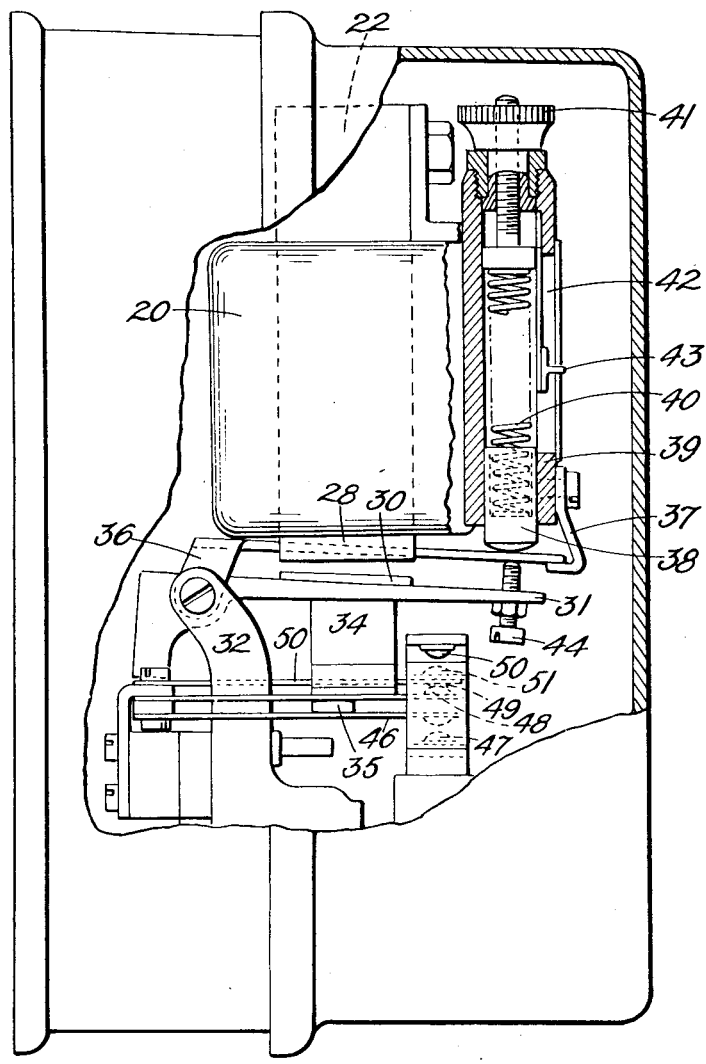

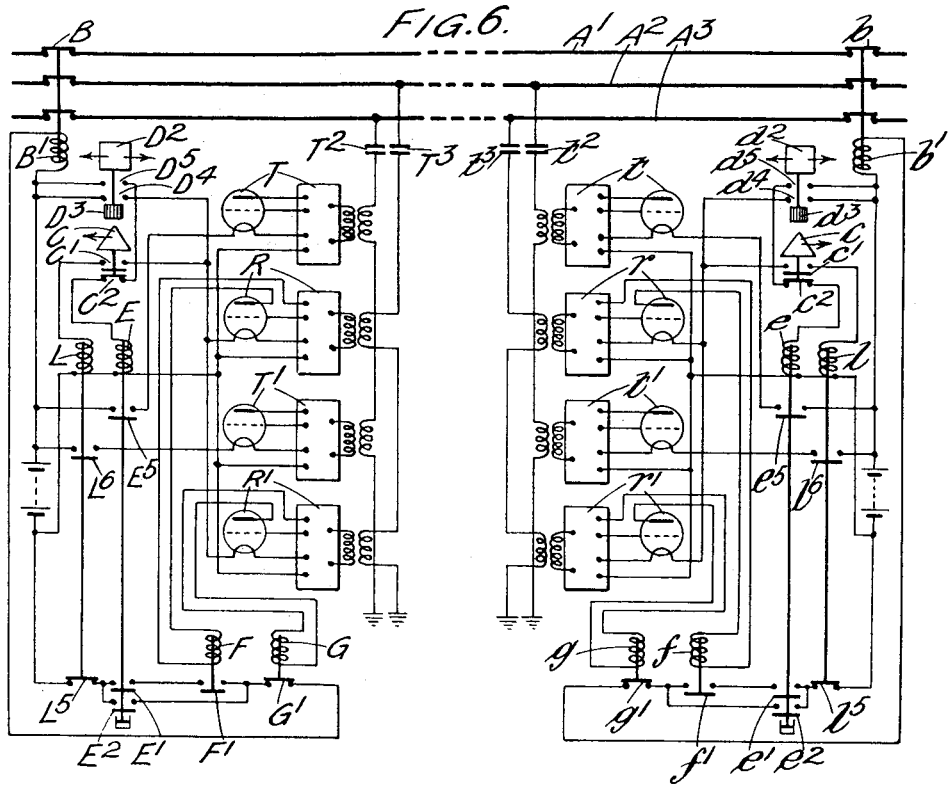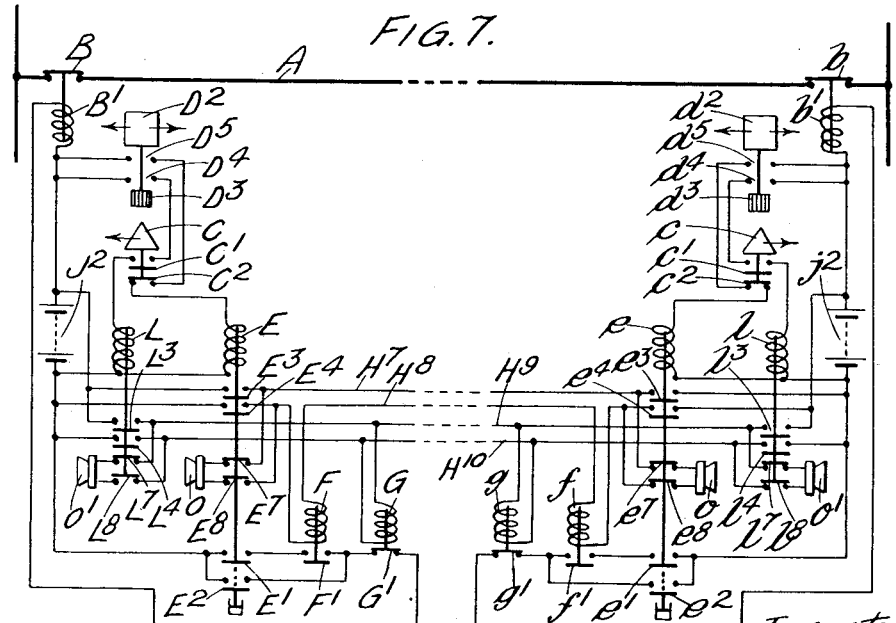

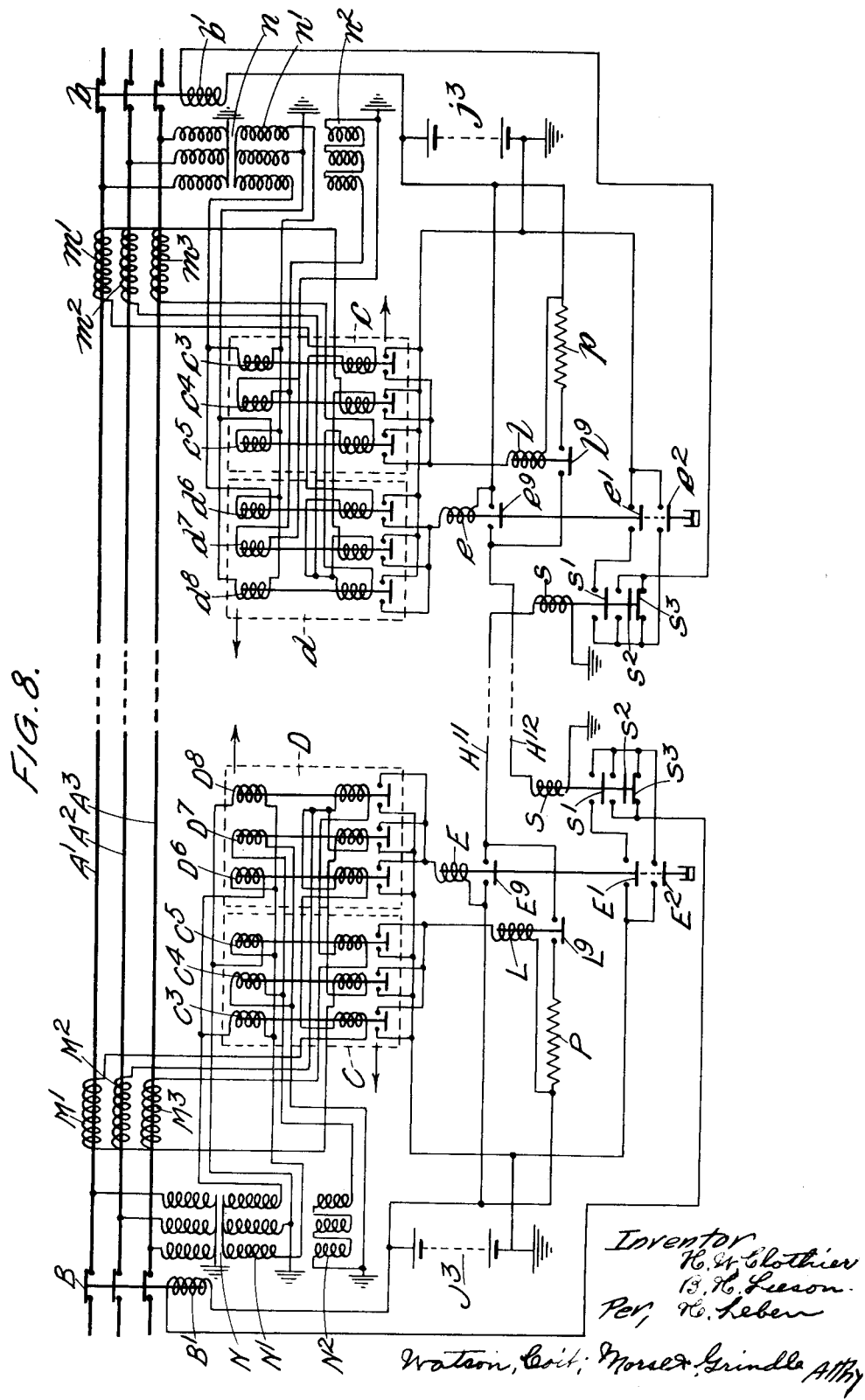

Patented July 18, 1933

1,919,092

UNITED STATES PATENT OFFICE

HENRY WILLIAM CLOTHIER, OF NEWCASTLE-UPON-TYNE, BRUCE HAMER LEESON, OF TYNEMOUTH, AND HENRY LEBEN, OF HARROW, ENGLAND, ASSIGNORS TO A. REYROLLE & COMPANY LIMITED, OF HEBBURN-ON-TYNE, ENGLAND, A COMPANY OF GREAT BRITAIN

PROTECTIVE ARRANGEMENT FOR SECTIONALIZED ELECTRIC POWER CIRCUITS

Application filed September 30, 1932, Serial No. 635,690, and in Great Britain October 15, 1931.

This invention relates to protective arrangements for sectionalized electric power circuits, and has for its object to effect improvements in the protective arrangement forming the subject of the prior United States of America Patent No. 1,765,887 standing in the names of one of the present applicants and another. In this prior arrangement there are provided at each end of the protected section a tripping relay device controlling a tripping circuit for the adjacent circuit-breaker, and a stabilizing relay device which operates, when power is flowing out from the section at the adjacent end, to prevent tripping of the circuit-breaker at the remote end, the circuit-breaker being tripped by the tripping relay device after a time interval sufficient to allow time for the operation of the remote stabilizing relay device. Although a very short time lag is sufficient to ensure satisfactory operation of the arrangement, it is preferable to reduce the tripping time to a minimum by dispensing with this time-lag, and the present invention enables this improvement to be effected.

In one arrangement according to the present invention each section is protected independently of the other sections by means of a protective arrangement comprising a tripping relay device at each end of the section, means whereby each tripping relay device initiates the transmission of a tripping current signal to the remote end of the section, means whereby the tripping of the circuit-breaker at each end of the section is controlled jointly by the operation of the adjacent tripping relay device and the reception of the tripping current signal from the remote end, and means for preventing tripping of the circuit-breakers at both ends when power is flowing into the section at one end and out from the section at the other end. The means for preventing tripping of the circuit-breakers preferably comprise a stabilizing relay device at each end which acts when power is flowing out from the section at the adjacent end to transmit a stabilizing current signal to the remote end of the section. In a convenient arrangement the circuit-breaker at each end of the protected section is controlled by a tripping circuit including three series-connected contacts, of which two are normally open and close on operation respectively of the two tripping relay devices whilst the third is normally closed and opens when a stabilizing current signal is received from the remote end.

With this arrangement the section is cut out without any time delay (except that inherent in the operation of the relays) in the event of a fault in the protected section itself provided that power can flow to the fault from both ends of the section, and the arrangement remains stable in the event of heavy straight-through currents in spite of the absence of a definite time-lag. In order to ensure satisfactory operation of the arrangement in cases where a fault in the section is fed from one end only or where the channel of communication for transmitting the necessary signals from one end of the section to the other breaks down, each tripping relay device may be made operative after a short time-lag to effect tripping of the adjacent circuit-breaker independently of the tripping relay device at the remote end provided that a stabilizing current signal has not meanwhile been received from the remote end.

Each tripping relay device may be directional or non-directional in operation, the device in the former case being operative in the event of a fault only when power is flowing into the section at the adjacent end, whilst in the latter case the device is operative in the event of a fault irrespective of the direction of power flow and is arranged to operate slightly after the adjacent stabilizing relay device.

Any suitable channel of communication may be employed for transmitting the necessary signals from the tripping and stabilizing relay devices to cause operation of the corresponding contacts at the other end. Thus for example when pilot wires are available, D. C. signals or A. C. signals at low or high frequency may be transmitted, whilst in other cases high frequency carrier currents over the main conductors may be employed.

The invention may be carried into practice in various ways and the following is a description, by way of example, of several convenient practical arrangements in accordance therewith, with reference to the accompanying drawings in which—

Figure 1 is a schematic diagram of an arrangement employing directional tripping relay devices, Figure 2 shows a modification of the arrangement shown in Figure 1, Figure 3 is a schematic diagram of an arrangement employing non-directional tripping relays, Figure 4 is a front elevation, with the cover partly removed, of the preferred construction of a relay for use in a protective system according to this invention, Figure 5 is a side elevation, partly in section, of the relay shown in Figure 4, Figure 6 is a schematic diagram of an arrangement employing carrier current instead of pilot wires between the ends of a protected section, Figure 7 is a schematic diagram of yet another arrangement, Figure 8 is a wiring diagram of an arrangement, somewhat similar to that shown schematically in Figure 1, for a three-phase feeder, and Figure 9 is a wiring diagram of the preferred arrangement for a three-phase feeder.

For convenience of description it will be assumed that the protected line or feeder, whether single-phase or polyphase, consists of a section of a high tension power transmission line forming part, for example, of a ring main and in the figures, the apparatus at one end of the section, conveniently referred to as the "home" end, is indicated in capital reference letters and the corresponding apparatus at the other end of the section, referred to as the "remote" end, in small reference letters.

In the arrangement shown in Figure 1 the protected feeder A is provided at its ends with circuit-breakers B, $b$ having trip coils $B^1$, $b^1$ respectively and with protective gear comprising stabilizing relay devices C, $c$ tripping relay devices D, $d$ and groups of auxiliary relays E, F, G and $e$, $f$, $g$ controlled by the stabilizing and tripping relay devices and respectively controlling the circuits of the trip coils $B^1$ and $b^1$. The protective gear at one end is connected to that at the other end by pilot wires H, $H^1$, $H^2$, $H^3$.

The tripping relay devices D, $d$ are directional in operation and are so energized from the protected feeder A that they operate to close their contacts $D^1$, $d^1$ when the overload and/or earth leakage currents flowing in the feeder exceed a predetermined value and when power is flowing into the feeder at the adjacent end. The stabilizing relay devices C, $c$ are also directional and are so associated with the feeder that they operate to close their contacts $C^1$, $c^1$ when the overload and/or earth leakage currents flowing in the feeder exceed a predetermined value and when power is flowing out from the section at the adjacent end. The stabilizing and tripping relay devices, which are diagrammatically indicated in the drawings by triangles and squares respectively, may consist of any convenient arrangements of directional relays energized from the adjacent ends of the protected section.

The tripping relay device D at the home end, when it operates and closes its contact $D^1$, connects a battery J to an auxiliary tripping relay E at the adjacent end and also to the pilot wire H, this pilot wire being connected at the remote end to the relay $f$ which acts as a remote tripping repeat relay since it is energized when the tripping relay device at the home end operates. Similarly, operation of the remote tripping relay device $d$ connects a battery $j$ at the remote end to the home tripping repeat relay F over the pilot wire $H^1$ and also to the remote auxiliary tripping relay $e$. The stabilizing relay device C when it operates closes its contacts $C^1$ and connects the battery J to one end of the pilot wire $H^2$ the other end of which is connected to the auxiliary relay $g$ which thus acts as a remote stabilizing repeat relay whilst operation of the stabilizing relay device $c$ at the remote end connects the battery $j$ through the pilot wire $H^3$ to the home stabilizing repeat relay G. The other sides of the batteries J, $j$ and also of the coils of the relay E, F, G, $e$, $f$, $g$ are earthed, or alternatively, if desired, a fifth pilot wire may be employed as the return circuit.

The circuit of the trip coil $B^1$ is controlled by the normally open contacts $E^1$ and $F^1$ of the auxiliary tripping relay E and home tripping repeat relay F respectively and also the normally closed contact $G^1$ of the home stabilizing repeat relay G. The auxiliary tripping relay E is also provided with a normally open time-lag contact $E^2$, which acts to short-circuit the contacts $E^1$ and $F^1$ and whose time lag is so adjusted as to allow time for the opening of the contact $G^1$ on the home stabilizing repeat relay G before the contact $E^2$ closes. At the remote end the circuit of the trip coil $b$ is similarly controlled by the contacts $e^1$, $f^1$, $g^1$ and also by the time-lag contact $e^2$.

In the event of an internal fault in the section when the section is connected to a source of power at both ends, the fault current will flow into the section from both ends and the home and remote tripping relay devices D, d will operate whilst the two stabilizing relay devices C, c remain inoperative. The operation of the home tripping relay device D causes the auxiliary relay E to close its contact $E^1$ and the remote tripping repeat relay $f$ to close its contact $f^1$, whilst the operation of the remote tripping relay device $d$ causes the remote auxiliary tripping relay $e$ to close its contact $e^1$ and the home tripping repeat relay F to close its contact $F^1$. The circuit of the trip coil $B^1$ is thus completed at the contacts $F^1$, $E^1$ and this coil operates to open the circuit-breaker B, the trip coil $b^1$ at the remote end being similarly energized to open the circuit-breaker $b$.

In the event of the external fault causing a heavy straight-through current to flow in the protected circuit, say from the home end to the remote end, the home tripping relay device D and the remote stabilizing relay device $c$ will operate, and the remote tripping relay device $d$ and the home stabilizing relay device C will remain inoperative. The operation of the tripping relay device D energizes the home auxiliary tripping relay E and the remote tripping repeat relay $f$, whilst the operation of the remote stabilizing relay device $c$ energizes the home stabilizing repeat relay G, which opens its contact $G^1$ thus preventing energization of the circuit-breaker trip coil $B^1$ which would otherwise take place, after a short time lag, owing to the closing of contact $E^2$ of the relay E. The circuit of the remote trip coil $b^1$ remains open at the contacts of the remote auxiliary tripping relay $e$.

In the case of an internal fault fed from one end of the section only, say from the home end, the home tripping relay device D will operate, but the remote tripping relay device and the two stabilizing relay devices will remain inoperative. The circuit of the trip coil $B^1$ will then be completed, after a short time delay, at the contact $E^2$ of the auxiliary tripping relay E and the circuit-breaker B will open.

Thus the section A is cut out without any time delay (other than that inherent in relay operation) except in the somewhat rare event of a fault fed from one end only and even in this case the time delay can be very short. For a time lag of, say, one fifth of a second is usually sufficient, in the case of an external fault, to allow the operation of the stabilizing relay device and the stabilizing repeat relay before the time-lag contact $E^2$ or $e^2$, as the case may be, operates.

The number of pilot wires used may be reduced in various ways. Thus for instance, as shown in Figure 2, an economy of one pilot wire can be effected by using a single pilot wire $H^4$ for carrying the stabilizing currents from the two ends. With this arrangement the home stabilizing repeat relay is connected to the pilot wire $H^4$ through back contacts $C^2$ of the home stabilizing relay C which are closed when this relay is in its inoperative position. Operation of the stabilizing relay C disconnects the relay G from the pilot wire $H^4$ and connects the battery J to this pilot wire so that the stabilizing repeat relay $g$ at the remote end (not shown) is energized. This arrangement can be employed owing to the fact that the stabilizing relays are directional and only operate when the current is flowing out from the section at the adjacent end with the result that only one stabilizing relay will operate at one time.

If desired an economy of two pilot wires can be effected by utilizing one pilot wire to carry both the stabilizing and the tripping current signals from the home end to the remote end, and one pilot wire for carrying the corresponding signals from the remote end to the home end. In this case discrimination between stabilizing and tripping can be effected by polarizing the repeat relays and using currents of different polarities.

The arrangement shown schematically in Figure 3 differs from that shown in Figure 1 mainly in the fact that tripping relay devices $D^2$, $d^2$ are non-directional so that they operate at a predetermined degree of overload (or earth leakage current) irrespective of the direction of power flow. The arrangement of the auxiliary and repeat relays and the manner in which they control the circuit-breakers may be very similar to the arrangement shown in Figure 1 but as actually shown in this figure they are modified somewhat in order to reduce the number of pilot wires required to two only.

In the arrangement shown in Figure 1 it will be remembered that the directional characteristic of the tripping relay devices D, $d$ is relied upon for the purpose of preventing tripping in the event of heavy straight-through currents, for if these devices were made non-directional, without any other change, the home tripping repeat relay F would operate in the event of a straight-through current flowing from the home end to the remote end and there would be risk of cutting out of the section owing to the possibility of the home tripping repeat relay F and the home auxiliary tripping relay E closing their contacts $F^1$ and $E^1$ before the opening of the home stabilizing repeat relay contact $G^1$. In other respects the arrangement would operate satisfactorily and it will be appreciated therefore that the only further changes required consequent on the use of non-directional tripping relays are those necessary to ensure that in the event of a heavy straight-through current the appropriate stabilizing repeat relay will operate before the corresponding tripping repeat relay.

This may be achieved by so arranging the tripping and stabilizing relay devices that the stabilizing relay will operate slightly before the tripping relay. In practice this can be effected in a simple manner in the majority of instances by giving the stabilizing relay device a lower current setting than the tripping relay device and relying on the shape of the characteristic time-current curve of the relays to ensure the earlier operation of the stabilizing relay. The slight time delay involved in ensuring operation of the stabilizing relay before that of the tripping relay can in practice be reduced to a very small value. Alternatively the time delay can in some instances, especially in cases where the same channel of communication is used for transmitting the tripping and stabilizing current signals from one end to the other, be reduced to that inherent in the sequential operation of relays, by so interlocking the tripping and stabilizing relays that the stabilizing current signal has precedence over the tripping current signal.

In the two pilot wire arrangement shown in Figure 3 two local batteries $J^1$ and $K$ (or $j^1$ and $k$) are provided at each end for transmitting the tripping current signal and the stabilizing current signal respectively, the tripping batteries $J^1$, $j^1$ having a considerably lower terminal voltage than the stabilizing batteries $K$, $k$, the two voltages being, for example, 15 and 45 volts. At the home end the tripping battery $J^1$ is connected to the pilot wires $H^5$ and $H^6$ through normally open contacts $E^3$ and $E^4$ of the auxiliary tripping relay E and also through normally closed contacts $L^1$ and $L^2$ of an auxiliary stabilizing relay L and the stabilizing battery K is connected to the pilot wires $H^5$ and $H^6$ through normally open contacts $L^3$ and $L^4$ of the auxiliary stabilizing relay L, and also through the auxiliary tripping relay contacts $E^4$ and $E^3$.

The tripping repeat relays $F^2$, $f^2$ at the two ends are polarized to be responsive to current flowing in one direction in the pilot circuit and the stabilizing repeat relays $G^2$, $g^2$ are polarized to respond to current flowing in the opposite direction in the pilot wire circuit, the four relays being connected in series with one another in the pilot wire $H^6$. The connections of the stabilizing batteries $K$, $k$ to the pilot circuit are such that whichever of these batteries is operative the direction of current flow is such as to operate the two stabilizing repeat relays $G^2$, $g^2$, whilst the two tripping batteries $J^1$, $j^1$ are connected so that their voltages are additive and cause the current to flow in a direction to operate the two tripping repeat relays $F^2$, $f^2$. The contacts $E^1$, $E^2$ of the auxiliary tripping relay and the contacts $F^3$ and $G^3$ of the polarized tripping and stabilizing repeat relays $F^2$ and $G^2$ are connected in the circuit of the trip coil $B^1$ of the circuit breaker in the same way as are the corresponding contacts $E^1$, $E^2$, $F^1$ and $G^1$ in the arrangement shown in Figure 1.

It is, in practice, desirable to give the stabilizing relay devices C, c a low setting and, in order to avoid repeated connection of a stabilizing battery K or k to the pilot wires in the event of transient slight over-loading during normal running, it is desirable to prevent energization of the stabilizing relay device from being effective unless the adjacent tripping relay device has operated. Since however it is important to ensure operation of the stabilizing relay before the tripping relay a special construction of relay is employed for each relay of the tripping relay device. Generally this special relay comprises an operating coil, a movable member electromagnetically controlled by the operating coil, two contacts or sets of contacts sequentially operated by movement of such member, and means whereby a lower current setting is obtained for operation of the first contact or set of contacts than for operation of the second contact or set of contacts.

The preferred construction of two-current setting relay, as shown in Figures 4 and 5, has two operating coils 20 and 21 mounted on a fixed magnetic core 22 and connected in series. The coil 20 is provided with a number of tappings which are brought out to brass segments 23 and 24 suitably mounted on insulating strips 25 and 26 on the front of the relay so that any pair of opposite segments can be connected by means of a plug 27 which serves to bring into circuit appropriate sections of the coil. The various positions in which the plug 27 can be inserted are calibrated in terms of the relay current at which the first contact closes.

Arranged below the poles 28 and 29 at the lower ends of the limbs of the core 22 is an armature 30 carried on an arm 31 pivoted between two fixed frame members 32 and 33 projecting upwardly at the back of and below the coils. Attached to the underside of the arm 31, below the armature 30, is a block 34 which supports a transverse contact operating member 35. The relay is provided with three pairs of contacts which are controlled by the member 35 and each of which consists of a fixed contact and a cooperating moving contact carried on a spring arm which is mounted on an insulating block on the framework at the rear of the upwardly projecting members 32 and 33.

The spring-loaded stop for controlling the high current setting of the relay consists of a forked lever 36 pivoted to the members 32 and 33 and extending towards the front of the relay between the poles 28 and 29 so that it is above the arm 31 carrying the armature 30. The lever 36 is prevented from rotating in a clockwise direction about its pivot on to the arm 31 by a fixed hook-like stop 37 against which it is pressed by a plunger 38 carried in a cylinder 39 mounted on the front of the core 22. The plunger 38 is pressed downwardly on to the lever 36 by a spring 40 the tension of which is adjusted by a milled nut 41, a slot 42 being provided in the cylinder 39 through which a pointer 43 attached to the spring projects to indicate the tension of the spring. An adjustable bolt 44 has its end projecting above the end of the arm 31 so that, after a predetermined upward movement of the armature 30, the end of the bolt 44 engages the lever 36 and thus brings the spring 40 into action to exert an additional loading force opposing further upward movement of the armature.

In the normal deenergized position of the relay the contact operating member 35 is in its lowest position and presses the spring contact arm 46 against a fixed contact 47, these contacts thus being closed when the relay is deenergized. When a current equal to the "first stage setting" current, as determined by the adjustable plug 27, (3 amps. with the setting shown in Figure 4) passes through the operating coils 20 and 21 the electromagnetic attraction of the armature 30 causes the arm 31 to rotate about its pivot until the contact operating member 35 lifts a spring contact arm 48 into engagement with a fixed contact 49, in which position the armature is shown in Figures 4 and 5. This movement of the armature thus closes the "first" contact of the relay and also opens the back contacts 46 and 47, further movement of the arm 31 being prevented by the additional loading due to the spring 40.

When the current flowing through the operating coils 20 and 21 is greater than the second stage setting, as determined by the adjustment of the spring 40 (225% of the first stage setting with the indicator 43 in the position shown in Figures 4 and 5), the magnetic attraction is sufficient to overcome the force of the spring 40, and the armature 30 moves upwardly to the position in which the contact operating member 35 causes the contact on the spring arm 51 to engage the fixed contact 50, thus closing the "second" contact of the relay.

It is to be understood that the above description is by way of example only and that the construction of the relay may be modified in various ways, for example, the first contact may be so mounted as itself to perform the functions of the spring loaded stop.

The tripping relay devices $D^2$, $d^2$ are diagrammatically indicated as being of the above-described type, the home tripping relay device $D^2$ being provided with an armature $D^3$, which acts at the lower setting to bridge contacts $D^4$ and at the higher setting to bridge contacts $D^5$ without opening the contacts $D^4$. The contacts $D^4$ are connected in series with the contacts $C^1$ of the stabilizing relay device C so that the auxiliary stabilizing relay L is not energized until both the contacts $C^1$ and $D^4$ are closed, whilst the contacts $D^5$ control the circuit of the auxiliary tripping relay E. The remote tripping relay $d^2$ is of the same type and has an armature $d^3$ and the contacts $d^4$, $d^5$ which are connected to the adjacent protective gear in the same way as are the contacts $D^4$, $D^5$ at the home end.

In the case of an internal fault fed from both ends the tripping relays $D^2$, $d^2$ operate to close, first their contacts $D^4$, $d^4$ and then their contacts $D^5$, $d^5$. As the stabilizing relay devices C, c remain inoperative, the closing of contacts $D^4$, $d^4$ is ineffective. Closing of contact $D^5$ at the home end causes the energization of auxiliary tripping relay E operation of which closes, at its contact $E^1$, a point in the circuit of trip coil $B^1$ and, at its contacts $E^3$, $E^4$ connects battery $J^1$ to the pilot wires $H^5$, $H^6$. Similarly at the remote end relay e operates to close a point in the circuit of the trip coil $b^1$ and to connect the battery $j^1$ to the pilot circuit. The batteries $J^1$, $j^1$, being connected in series, cause a tripping current signal to flow in the pilot circuit and the tripping repeat relays $F^2$ and $f_2$ to operate to close their contacts $F^3$ and $f^3$ respectively so that the circuit of the trip coils $B^1$ and $b^1$ are completed and the circuit-breakers B and b open to cut out the section.

For a heavy straight-through current flowing from the home end to the remote end, the two tripping relay devices $D^2$, $d^2$ and the remote stabilizing relay device c operates. This causes the home tripping battery $J^1$ and the remote stabilizing battery k to be connected to the pilot wires $H^5$ and $H^6$ through the contacts $E^4$ and $E^3$ of the home auxiliary tripping relay E and through the contacts $e^3$ and $e^4$ of the remote auxiliary tripping relay e and the contacts $l^3$ and $l^4$ of the remote auxiliary stabilizing relay l respectively. Owing to the difference in the voltages of the batteries $J^1$, k the resultant current flows in the stabilizing direction in the pilot circuit and operates the two stabilizing repeat relays $G^2$, $g^2$ the tripping repeat relays $F^2$, $f^2$ remaining inoperative. The normally closed contacts $G^3$ and $g^3$ thus open and the circuit-breakers B, b remain closed at both ends.

For an internal fault fed from, say, the home end only the home tripping relay device $D^2$ operates. Although this connects the home tripping battery J to the pilot wires, no signal is transmitted since the pilot circuit is open at the contacts $e^4$, $e^3$ of the auxiliary tripping relay $e$ at the remote end. The home circuit-breaker B is however tripped by the time-lag contact $E^2$ on the home auxiliary tripping relay E.

The same arrangements can be employed whether D.C. or A.C. of high or low frequency is used for the stabilizing and tripping current signals, except that the modification employing polarized repeat relays is applicable only to D.C. working, whilst the use of A.C. working offers the further alternative of effecting discrimination by the use of different frequencies.

Thus in the arrangement shown in Figure 6 pilot wires are dispensed with and the tripping and stabilizing currents are transmitted in the form of high-frequency signals superimposed on the power line. Non-directional tripping relay devices $D^2$, $d^2$ of the two-current setting type above described are employed in conjunction with directional stabilizing relay devices C, $c$, the low current setting contacts $D^4$, $d$ of the tripping relay devices being connected in series with the normally open contacts $C^1$, $c^1$ of the stabilizing relay devices in the energizing circuits of the auxiliary stabilizing relays L, $l$ whilst the high current setting contacts $D^5$ $d^5$ of the tripping relay devices in series with back contacts $C^2$, $c^2$ of the stabilizing relay devices similarly control the auxiliary tripping relays E, $e$. The circuit of the trip coil $B^1$ of the home circuit-breaker B is controlled by contacts on the auxiliary tripping relay E and the tripping and stabilizing repeat relays F, G in a manner similar to that described with reference to Figure 1 and also by a normally closed contact $L^5$ on the auxiliary stabilizing relay L, the remote circuit-breaker $b$ being similarly controlled.

The high frequency apparatus at the home end comprises tripping and stabilizing transmitters T and $T^1$ respectively and tripping and stabilizing receivers R and $R^1$, the transmitters and receivers being indicated diagrammatically and each including a three-electrode valve or the equivalent which controls or is controlled by the transmitter or the receiver as the case may be. The tripping transmitter T is controlled by a normally open contact $E^5$ on the auxiliary tripping relay E whilst the tripping and stabilizing receivers R, $R^1$ are controlled by the "low" current setting contact $D^4$ of the tripping relay device. The stabilizing transmitter $T^1$ is controlled by the normally open contact $L^6$ of the auxiliary stabilizing relay L. The tripping and stabilizing repeat relays F and G are respectively connected to the receivers R and $R^1$ so that they are energized by tripping and stabilizing signals received from the remote end. The transmitters T and $T^1$ are connected to one phase $A^3$ of the power line by a condenser coupling $T^2$ and the receivers R and $R^1$ to another phase $A^2$ by a condenser coupling $T^3$.

The remote end is provided with similar apparatus including tripping and stabilizing transmitters $t$, $t^1$ and receivers $r$, $r'$. The two tripping transmitters T and $t$ are arranged to transmit at the same frequency, and the two stabilizing transmitters $T^1$ and $t^1$ at the same frequency as one another but at a frequency which is different from that of the tripping transmitters. The tripping receiver at each end is tuned to the tripping frequency, whilst the stabilizing receivers are tuned to the stabilizing frequency. Preferably the receivers are provided with filters or rejector circuits which ensure that they will only be operated by signals from the appropriate transmitter. If desired, any suitable form of choking device can be arranged in power line A at each end of the section to prevent the superimposed high frequency currents entering the adjoining sections.

During a straight-through fault, when, say the direction of power flow is from the home to the remote end, the home and remote tripping relay devices $D^2$, $d^2$ and the remote stabilizing relay device $c$ operate. At the home end the operation of the relay device $D^2$ causes first, at its contact $D^4$, the bringing into operation of both the receivers R and $R^1$ so that they are ready to receive signals from the remote end and then, after a very short time interval which is only sufficient to allow the sequential operation of the contacts $D^4$ and $D^5$ and the operation of the relay E, the starting-up of the transmitter T so that tripping signals are sent to the remote end.

At the remote end the operation of the tripping relay device $d^2$ renders, at its contact $d^4$, the receivers $r$ and $r^1$ operative, and the stabilizing relay device $c$ at its contact $c^1$ energizes the auxiliary stabilizing relay $l$ and at its contacts $c^2$ prevents energization of the auxiliary tripping relay $e$. Thus the remote stabilizing transmitter $t^1$ is rendered operative at contact $l^6$ but the remote tripping transmitter $t$ does not operate, and at the same time the energizing circuit to the remote trip coil $b^1$ is opened at contact $l^5$. The stabilizing current signal transmitted by the remote stabilizing transmitter $t^1$ is received by the home stabilizing receiver $R^1$, which energizes the home stabilizing repeat relay G to open the circuit to the home trip coil $B^1$ at contact $G^1$, so that the section remains in circuit.

When there is fault in the section which is fed from both ends the tripping relay devices $D^2$, $d^2$ operate and the stabilizing relay devices C, $c$ remain inoperative. Operation of relay device $D^2$ brings receivers R and $R^1$ into operation and then, when the contact $D^5$ closes, completes the circuit of the relay E which closes its contact $E^5$ to bring the transmitter T into operation. Similarly operation of relay device $d^2$ renders receivers $r$ and $r^1$ and transmitter $t$ operative and energizes relay $e$. The tripping signals from transmitter T act through receiver $r$ to energize remote tripping repeat relay $f$ and the tripping signals from transmitter $t$ act through receiver R to energize the home tripping repeat relay F. The circuits of the trip coils $B^1$, $b^1$ are completed at the contacts $E^1$, $F^1$ and $e^1$, $f^1$ respectively and the section is cut out by the operation of the circuit-breakers B, $b$ at both ends.

The operation of this arrangement in the event of an internal fault fed from one end only will be clear without further description.

Figure 7 shows schematically an arrangement which resembles that shown in Figure 3 in that non-directional two-current setting tripping relay devices and directional stabilizing relay devices are used but in which four pilot wires $H^7$, $H^8$, $H^9$, $H^{10}$ are employed so that the tripping and stabilizing repeat relays do not have to be polarized and only one battery is required at each end. The pilot wires are normally utilized for telephone, remote control, remote metering or for other purposes and are temporarily "borrowed" when the protective gear operates.

The energizing circuits of the auxiliary tripping relays E, $e$ and the auxiliary stabilizing relays L, $l$ are controlled by the tripping and stabilizing relay devices in the manner above described with reference to Figure 6. Two of the pilot wires $H^7$, $H^8$ are used for carrying the tripping current signals, these pilot wires (as shown) normally constituting a telephone pair. Thus at the home end these pilot wires are connected to telephone apparatus O through normally closed contacts $E^7$, $E^8$ on the auxiliary tripping relay E and on operation of the relay E are disconnected therefrom and are connected to a battery $J^2$ through the contacts $E^3$, $E^4$. Similar connections are provided at the remote end, except that the remote battery $j^2$ is connected to the pilot wires in the opposite sense, so that on simultaneous operation of the two auxiliary tripping relays E, $e$ the two batteries $J^2$, $j^2$ are connected in series with one another. The two tripping repeat relays F, $f$ are connected in series with the pilot wire $H^8$.

The other two pilot wires $H^9$, $H^{10}$, which are used for carrying the stabilizing current signals, are normally connected to telephone apparatus $O^1$, $o^1$ through the normally closed auxiliary stabilizing relay contacts $L^7$, $L^8$, $l^7$, $l^8$, the normally open contacts $L^3$, $L^4$, $l^3$, $l^4$ controlling the connections of these pilot wires to the batteries $J^2$, $j^2$. The stabilizing repeat relays G, $g$ are connected across these pilot wires.

On the occurrence of a straight-through fault during which the direction of power current flow is, for example, from the home to the remote end, the home and remote tripping relay devices $D^2$, $d^2$ and the remote stabilizing relay device $c$ operate and cause the operation of the home auxiliary tripping relay E and the remote auxiliary stabilizing relay $l$. The remote stabilizing relay device $c$ also opens, at its back contact $c^2$, the circuit of the remote auxiliary tripping relay $e$ so that this relay does not operate when the remote tripping relay device $d^2$ closes its contacts $d^5$.

The relay E disconnects the pilot wires $H^7$ and $H^8$ from the telephone apparatus O and connects them to the battery $J^2$ which, however, is ineffective owing to this pilot wire circuit being open at the contacts $e^3$, $e^4$ of the remote auxiliary tripping relay $e$. The operation of the remote auxiliary stabilizing relay $l$ disconnects the telephone apparatus $o^1$ from the pilot wires $H^9$, $H^{10}$ and connects these pilot wires to the battery $j^2$ which thus energizes the stabilizing repeat relays G, $g$ connected across this pilot wire circuit. The relays G, $g$ open their normally closed contacts $G^1$, $g^1$ thus positively opening the circuits of the trip coils $B^1$, $b^1$ of the circuit-breakers B, $b$ at the two ends.

When there is an internal fault fed from both ends the tripping relay devices $D^2$, $d^2$ operate and the stabilizing relay devices C, $c$ remain inoperative. As soon as the high current setting contacts $D^5$, $d^5$ of the tripping relay devices $D^2$, $d^2$ close, the auxiliary tripping relays E, $e$ operate to close, at their contacts $E^1$, $e^1$ respectively, points in the circuits of the trip coils of the adjacent circuit-breakers and, at their contacts $E^3$, $E^4$ and $e^3$, $e^4$, to connect the pilot wires $H^7$ and $H^8$ to the batteries $J^2$ and $j^2$ in series. A tripping current signal flows in the pilot wires $H^7$ and $H^8$ and the tripping repeat relays F and $f$ operate to complete the circuits of trip coils $B^1$ and $b^1$ respectively so that the circuit-breakers B and $b$ open to cut out the section. The auxiliary tripping relays E and $e$ are provided with time-lag contacts $E^2$ and $e^2$ so that in the event of a fault fed from one end only the circuit-breaker at the feeding end is opened after a short time delay.

The three-phase arrangement shown in Figure 8 is generally similar to that shown schematically in Figure 1 in that it employs directional tripping and stabilizing relay devices, but differs therefrom in employing only two pilot wires with an earth return circuit and in the use of relays of the two-current-setting type described above for the stabilizing and tripping repeat relays.

At the home end the tripping relay device D comprises three directional relays $D^6$, $D^7$, $D^8$ having normally open contacts which are connected in parallel in the circuit of the auxiliary tripping relay E. The stabilizing relay device C comprises three directional relays $C^3$, $C^4$, $C^5$ having normally open contacts which are connected in parallel in the circuit of the auxiliary stabilizing relay L. The current coils of the relays $C^3$, $C^4$, $C^5$ and $D^6$, $D^7$, $D^8$ are energized from the secondary windings of current transformers $M^1$, $M^2$, $M^3$ in the three phases $A^1$, $A^2$, $A^3$ of the protected line whilst the voltage coils of these relays are connected to the secondary and tertiary windings $N^1$, $N^2$ of a potential transformer N having its primary winding connected to the phases $A^1$, $A^2$, $A^3$, the arrangement being such that at least one of the relays operates when there is an overload and/or earth leakage current flowing in the appropriate direction.

In this arrangement two pilot wires $H^{11}$ and $H^{12}$ are provided between the home and remote ends, the pilot wire $H^{11}$ being utilized in combination with an earth return circuit for transmitting tripping and stabilizing currents from the home end to the remote end and the pilot wire $H^{12}$ for transmitting the tripping and stabilizing currents from the remote end to the home end. The auxiliary tripping relay E has a normally open contact $E^9$ arranged when the relay operates to connect the pilot wire $H^{11}$ to the battery $J^3$. The auxiliary stabilizing relay L, when it is energized by the operation of any one of the relays $C^3$, $C^4$, $C^5$, closes its normally open contact $L^9$ to connect the pilot wire $H^{11}$ to the battery $J^3$ in series with a resistance P, so that the stabilizing current flowing in the pilot wire $H^{11}$ as a result of the operation of the stabilizing relay device C, is less than the tripping current flowing in this pilot wire as a result of the operation of the tripping relay device D.

The pilot wire $H^{12}$ is connected at the home end to a combined tripping and stabilizing repeat relay S having normally open high current setting contacts $S^1$, $S^2$ and a normally closed low current setting contact $S^3$, the contacts $S^2$ and $S^3$ being connected in parallel with one another. Thus with a stabilizing current flowing through the relay coil the contact $S^3$ opens without closing either of the contacts $S^1$, $S^2$, whilst with a tripping current flowing through the relay coil the contact $S^3$ opens and both contacts $S^1$, $S^2$ close. The contact $S^1$ thus corresponds generally to the contact $F^1$ of Figure 1 and the contacts $S^2$, $S^3$ together correspond to the contact $G^1$, the energizing circuit of the trip coil $B^1$ otherwise being identical with that of Figure 1.

The value of the resistance P is chosen so that the tripping and stabilizing currents transmitted from the battery $J^3$ over the pilot wire $H^{11}$ to a repeat relay $s$ at the remote end respectively correspond to the high and low current settings of this relay. The apparatus at the remote end is similar to that at the home end and only differs in that the auxiliary tripping and stabilizing relays $e$ and $l$ control the connection of the battery $j^3$ to the pilot wire $H^{12}$, whilst the remote repeat relay $s$ is connected to the pilot wire $H^{11}$.

In the event of an internal fault in the section fed from both ends the home and remote tripping relay devices D, $d$ operate but the stabilizing relay devices C, $c$ remain inoperative. At the home end the auxiliary tripping relay E closes its contact $E^9$ to connect the pilot wire $H^{11}$ to the battery $J^3$ so that a tripping current is transmitted over this pilot wire to the remote end. The relay E also closes, at its contact $E^1$, a point in the circuit of the circuit-breaker trip coil $B^1$. At the remote end the auxiliary tripping relay $e$ operates to connect the pilot wire $H^{12}$ to the battery $j^3$ so that a tripping current is transmitted over this pilot wire to the home end, the operation of this relay also closing a point in the circuit of the trip coil $b^1$.

The tripping current from the remote end energizes the home repeat relay S sufficiently for this relay to close its high current setting contacts $S^1$, $S^2$, thus completing the circuit of the trip coil $B^1$ which operates to open the circuit-breaker B. Similarly, the tripping current from the home end to the remote end causes the relay $s$ to close its contacts $s^1$ $s^2$, thus completing the circuit of the trip coil $b^1$, which is energized to open the circuit-breaker $b$.

In the event of a straight-through current, say, from the home end to the remote end, the home tripping relay device D and the remote stabilizing relay device $c$ operate. The operation of the remote stabilizing relay device $c$ energizes the auxiliary stabilizing relay $l$ which operates to connect the pilot wire $H^{12}$ to the battery $j^3$ in series with the resistance $p$. A stabilizing current is thus transmitted over the pilot wire $H^{12}$ to the home repeat relay S which operates only its low current setting contact $S^3$ and thus prevents tripping of the circuit-breaker B. The operation of the tripping relay device D at the home end causes a tripping current to be transmitted over the pilot wire $H^{11}$ to the remote end, thus operating the remote repeat relay $s$ so that this relay closes its contacts $s^1$, $s^2$. The remote circuit-breaker is not tripped out, however, since the remote auxiliary tripping relay $e$ is not energized and the circuit of the trip coil remains open at the contact $e^1$ of this relay.

The auxiliary tripping relays E and $e$ are provided with time-lag contacts $E^2$ and $e^2$ so that in the event of a fault fed from one end only, or in the event of one of the pilot wires $H^{21}$ or $H^{22}$ breaking, the operation of the tripping relay device at either end causes the closing of the time-lag contact of the associated auxiliary tripping relay.

If desired, this arrangement can be employed with non-directional tripping relays in which case the tripping relay devices at each end will consist of a group of two-current-setting relays as in the arrangement shown schematically in Figure 3.

Figure 9 illustrates a preferred practical embodiment for the protection of a three-phase feeder of the arrangement schematically indicated in Figure 3. In this arrangement the tripping relay devices $D^2$, $d^2$ consist of three single coil relays $D^9$, $D^{10}$, $D^{11}$ of the two-current setting type referred to above, the coils of these relays being energized from the secondary windings of the current transformers $M^1$, $M^2$, $M^3$ or $m^1$, $m^2$, $m^3$, as the case may be, in the phases $A^1$, $A^2$, $A^3$ of the protected feeder in such a manner that at least one of the relays operates when there is an overload or earth leakage current flowing in the protected section at the adjacent end.

Each stabilizing relay device C or c consists of three two-coil relays, $C^6$, $C^7$, $C^8$ or $c^6$, $c^7$, $c^8$, one of the coils of each relay being energized from the secondary windings of the current transformers $M^1$, $M^2$, $M^3$ or $m^1$, $m^2$, $m^3$ whilst the other coil is energized from a three-phase potential transformer N or n as the case may be.

At the home end the secondary windings of the current transformers $M^1$, $M^2$, $M^3$ are connected in star and the coil of the relay $D^{10}$ and the current coil of the relay $C^7$ are connected in series between this star point and the free end of the secondary winding of the transformer $M^2$. The coil of the relay $D^9$ and the current coil of the relay $C^6$ are connected in series between the free ends of the secondary windings of the transformers $M^1$ and $M^2$, whilst the coil of the relay $D^{11}$ and the current coil of the relay $C^8$ are connected in series between the free ends of the secondary windings of the transformers $M^3$ and $M^2$. The coils of the relays $D^9$, $D^{10}$, $D^{11}$ and the current coils of the relays $C^6$, $C^7$, $C^8$ are thus connected to the secondary windings of the current transformers M, $M^1$, $M^2$ in an unsymmetrical manner which is such that on the occurrence of an overload due to an interphase fault or an earth fault, either inside or outside the protected section one or more of these coils are energized sufficiently to cause the operation of the associated relay provided, in the case of the stabilizing relays $C^5$, $C^6$, $C^7$, that the associated voltage coil of the relay is appropriately energized. It is to be noted that the relays $C^7$ and $D^{10}$ have their coils connected in series to the star point of the secondary windings of the current transformers, so that these relays are operative when there is an earth fault and can thus be arranged so that the sensitivity to earth faults is different from the sensitivity to interphase faults.

The potential transformer N is provided with a secondary winding $N^1$ and a tertiary winding $N^2$. The windings $N^1$ are connected in star and to the potential coils of the relays $C^6$ and $C^8$ so that the potential coils of these relays are energized when there is an interphase fault and power is flowing out from the section in a direction from the remote to the home end whilst the tertiary winding $N^2$ is connected in open delta to the potential coil of the relay $C^7$ so that this coil is energized when there is an earth fault current and power is flowing out from the home end of the section.

The relays $D^9$, $D^{10}$, $D^{11}$ are provided with armatures $D^{12}$, $D^{13}$, $D^{14}$, low current setting contacts $D^{15}$, $D^{16}$, $D^{17}$ and high current setting contacts $D^{18}$, $D^{19}$, $D^{20}$ respectively, the relay $D^{10}$ being provided, in addition, with a back contact $D^{21}$ which is closed when the relay is deenergized. The relays $C^6$, $C^7$, $C^8$ are respectively provided with operating contacts $C^9$, $C^{10}$, $C^{11}$ and back contacts $C^{12}$, $C^{13}$, $C^{14}$ which are closed when the relays are deenergized. The relays of the tripping relay device $d^2$ and the stabilizing relay device c at the remote end are connected in a similar manner to the secondary windings of the current transformers $m^1$, $m^2$, $m^3$ and the secondary and tertiary windings $n^1$ and $n^2$ of the potential transformer n and are provided with corresponding contacts.

This arrangement differs from the arrangement shown in Figure 3 mainly in the employment of a single polarized relay at each end which replaces the stabilizing and tripping repeat relays $F^2$, $G^2$ and $f^2$, $g^2$ and in the arrangement of the contacts of the tripping and stabilizing relay devices.

As in the arrangement shown in Figure 3, two pilot wires $H^5$ and $H^6$ are employed and two batteries $J^1$, K and $j^1$, k of different voltage are provided at each end. The pilot wires are normally employed as a telephone circuit and the telephone apparatus $O^2$ at the home end is connected to the pilot wires through normally closed contacts $E^7$ and $E^8$ of the auxiliary tripping relay E and normally closed contacts $L^7$ and $L^8$ of the auxiliary stabilizing relay L, the telephone apparatus $o^2$ at the remote end being similarly connected to the pilot wires through the contacts $e^7$, $e^8$ of the relay e and $l^7$ and $l^8$ of the relay l.

The high current setting contacts $D^{18}$, $D^{19}$, $D^{20}$ of the relays $D^9$, $D^{10}$, $D^{11}$ are respectively connected in series with the back contacts $C^{12}$, $C^{13}$, $C^{14}$ of the stabilizing relays $C^6$, $C^7$, $C^8$, each pair of contacts $D^{18}$, $C^{12}$, $D^{19}$, $C^{13}$ and $D^{20}$, $C^{14}$ controlling the connection of the auxiliary tripping relay E to the battery $J^1$, so that this relay is energized when the high current contact of any one of the tripping relays $D^9$, $D^{10}$, $D^{11}$ closes, provided that the corresponding one of the stabilizing relays $C^6$, $C^7$, $C^8$ has not operated. The operating contacts $C^9$, $C^{10}$, $C^{11}$ in conjunction with low current setting contacts $D^{15}$, $D^{16}$, $D^{17}$ and the back contact $D^{21}$ control the energization of the auxiliary stabilizing relay L, so that this relay is energized from the battery $J^1$ over the contacts $D^{15}$, $C^9$ and $D^{21}$ in series, or the contacts $D^{17}$, $C^{11}$ and $D^{21}$ in series or the contacts $D^{16}$ and $C^{10}$ in series. It will be noted that the first two of these energizing circuits for the relay L include the normally closed back contact $D^{21}$, this additional contact being provided as a safety measure which ensures that in the event of an external interphase fault and an internal earth fault occurring simultaneously, the operation of the stabilizing relay $C^6$ or $C^8$ does not stabilize the protective gear and prevent the section being cut out by the operation of the gear due to the internal earth fault.

The auxiliary tripping and stabilizing relays E and L are, except for the additional contacts controlling the connection of the pilot wires to the telephones apparatus, generally similar to the corresponding relays in the arrangement of Figure 3 but the contact $E^1$ of the relay E, instead of directly controlling the circuit of the trip coil $B^1$, controls an auxiliary relay V whose contact $V^1$ controls the trip circuit. Further, instead of a time-lag contact $E^2$ on the relay E, a separate time-lag relay X is connected in parallel with this relay and is provided with a contact $X^1$ which when the relay operates, short circuits the contact $E^1$ and the normally open contact $U^1$ of the repeat relay U.

The combined tripping and stabilizing repeat relay U is connected in series in the pilot wire $H^6$ and is provided with a tripping repeat contact $U^1$ and a stabilizing repeat contact $U^2$. This relay is polarized and the contacts $U^1$ and $U^2$ are arranged so that the contact $U^1$ is normally open and the contact $U^2$ normally closed, these contacts being connected in the circuit of the auxiliary relay V and corresponding respectively to the contacts $F^3$ and $G^3$ of the separate tripping and stabilizing repeat relays $F^2$ and $G^2$ in the arrangement of Figure 3.

At the remote end the relays $e$, $l$, $u$, $v$, $x$ and their contacts are connected in the same way as the corresponding relays at the home end.

The combined stabilizing and tripping repeat relays U and $u$ are polarized in such a manner that when the pilot wires are connected to the batteries $J^1$ and $j^1$ these relays operate to close their tripping repeat contacts $U^1$, $u^1$, their stabilizing repeat contacts $U^2$, $u^2$ remaining closed, whilst when the pilot wires are connected at one end to the battery K or the battery $k$, and at the other end to the battery $j^1$ or the battery $J^1$, as the case may be, the higher voltage of the battery K or $k$ causes the current to flow in the pilot circuit in such a direction that the relays U and $u$ operate to open their stabilizing repeat contacts $U^2$, $u^2$, their tripping repeat contacts $U^1$, $u^1$ also remaining open. Thus the relays U and $u$ may be of the well-known two coil beam type employing pivotally supported beams $U^3$ and $u^3$, each of which is so connected with the associated contact carrying members that rocking of the beam in either direction affects movement of one only of the contact members. For this purpose each of the contact carrying members may be provided with collars $U^4$, $u^4$ fixed thereto so that movement of the beam in one direction will open the normally closed contact without affecting the normally open contact and movement of the beam in the other direction will close the normally open contact leaving the normally closed contact unaffected, the contacts being shown in their normal position in the drawing. It is obvious that this particular mechanical arrangement can be replaced by various other suitable mechanical equivalents therefor.

The operation of this arrangement will at once be clear from the description given above in connection with Figure 3.

It will be noticed that in each of the above arrangements tripping of the circuit-breaker will be effected (when the time-lag contacts on the tripping relays operate) in the event of an internal fault breaking the channel of communication over which the tripping and stabilizing current signals are transmitted. This is especially of importance when superimposed high frequency current working is employed.

It will be appreciated that the above arrangements have been described by way of example only and that the invention may be carried into practice in other ways and may be applied to the protection of circuits other than the single and three-phase transmission circuits referred to.

What we claim as our invention and desire to secure by Letters Patent is:—

1. The combination with a sectionalized electric power circuit, of circuit-breakers for isolating the sections of the power circuit from one another, a trip circuit for each circuit-breaker, and a protective arrangement for protecting each section independently of the other sections comprising a tripping relay device at each end of the section, means whereby each tripping relay device when it operates initiates the transmission of a tripping current signal to the remote end of the section, means whereby the trip circuit of the circuit-breaker at each end of the section is controlled jointly by the operation of the adjacent tripping relay device and by the tripping current signal received from the remote end, and means for preventing tripping of the circuit-breakers at both ends when power is flowing into the section at one end and out from the section at the other end.

2. An electric protective arrangement for a section of a sectionalized electric power circuit, comprising a circuit-breaker at each end of the section, a trip circuit for each circuit-breaker, a tripping relay device at each end of the section, means whereby each tripping relay device when it operates initiates the transmission of a tripping current signal to the remote end of the section, means whereby the trip circuit of each circuit-breaker is controlled jointly by the operation of the adjacent tripping relay device and by the tripping current signal received from the remote end, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, and means whereby the stabilizing current signal prevents tripping of the circuit-breaker at such remote end.

3. An electric protective arrangement for a section of a sectionalized electric power circuit, comprising a circuit-breaker at each end of the section, a trip circuit for each circuit-breaker, three series-connected contacts in each trip circuit of which two are normally open and the third is normally closed, a tripping relay device at each end of the section, means whereby each tripping relay device when it operates initiates the transmission of a tripping current signal to the remote end of the section, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, means whereby the operation of each tripping relay device causes the closing of one of the normally open contacts in the trip circuit at the adjacent end, means whereby a tripping current signal received from the remote end causes the closing of the other normally open contact in such trip circuit, and means whereby a stabilizing current signal received from the remote end causes the opening of the normally closed contact in such trip circuit.

4. An electric protective arrangement for a section of a sectionalized electric power circuit, comprising a circuit-breaker at each end of the section, a trip circuit for each circuit-breaker, a tripping relay device at each end of the section, means whereby each tripping relay device when it operates initiates the transmission of a tripping current signal to the remote end of the section, means whereby the trip circuit of each circuit-breaker is controlled jointly by the operation of the adjacent tripping relay device and by the tripping current signal received from the remote end, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, means whereby the stabilizing current signal prevents tripping of the circuit-breaker at such remote end, and means whereby each tripping relay device acts after a short time delay to complete the trip circuit of the adjacent circuit-breaker independently of the operation of the tripping relay device at the remote end provided that a stabilizing current signal has not meanwhile been received from such remote end.

5. An electric protective arrangement for a section of a sectionalized electric power circuit, comprising a circuit-breaker at each end of the section, a trip circuit for each circuit-breaker, three series-connected contacts in each trip circuit of which two are normally open and the third is normally closed, a tripping relay device at each end of the section, means whereby each tripping relay device when it operates initiates the transmission of a tripping current signal to the remote end of the section, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, means whereby the operation of each tripping relay device causes the closing of one of the normally open contacts in the trip circuit at the adjacent end, means whereby a tripping current signal received from the remote end causes the closing of the other normally open contact in such trip circuit, means whereby a stabilizing current signal received from the remote end causes the opening of the normally closed contact in such trip circuit, a normally open time-lag contact connected in the trip circuit of each circuit-breaker in parallel with the two aforesaid normally open contacts, and means whereby the operation of the adjacent tripping relay device causes after a short time delay the closing of said time-lag contact to complete the trip circuit provided that the normally closed contact has not meanwhile been opened by a stabilizing current signal received from the remote end.

6. The combination with a sectionalized electric power circuit, of circuit-breakers for isolating the sections of the power circuit from one another, a trip circuit for each circuit-breaker, and a protective arrangement for protecting each section independently of the other sections comprising a directional tripping relay device at each end of the section operative on the occurrence of a fault on the circuit only when power is flowing into the section at the end adjacent to the tripping relay device, means whereby each tripping relay device when it operates initiates the transmission of a tripping current signal to the remote end of the section, means whereby the trip circuit of the circuit-breaker at each end of the section is controlled jointly by the operation of the adjacent tripping relay device and by the tripping current signal received from the remote end, and means for preventing tripping of the circuit-breakers at both ends when power is flowing into the section at one end and out from the section at the other end.

7. An electric protective arrangement for a section of a sectionalized electric power circuit, comprising a circuit-breaker at each end of the section, a trip circuit for each circuit-breaker, three series-connected contacts in each trip circuit of which two are normally open and the third is normally closed, a directional tripping relay device at each end of the section operative on the occurrence of a fault on the circuit only when power is flowing into the section at the end adjacent to the tripping relay device, means whereby each tripping relay device when it operates initiates the transmission of a tripping current signal to the remote end of the section, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, means whereby the operation of each tripping relay device causes the closing of one of the normally open contacts in the trip circuit at the adjacent end, means whereby a tripping current signal received from the remote end causes the closing of the other normally open contact in such trip circuit, and means whereby a stabilizing current signal received from the remote end causes the opening of the normally closed contact in such trip circuit.

8. An electric protective arrangement for a section of a sectionalized electric power circuit, comprising a circuit-breaker at each end of the section, a trip circuit for each circuit-breaker, a tripping relay device operative on the occurrence of a fault on the circuit irrespective of the direction of power flow in the section, means whereby each tripping relay device when it operates initiates the transmission of a tripping current signal to the remote end of the section, means whereby the trip circuit of each circuit-breaker is controlled jointly by the operation of the adjacent tripping relay device and the tripping current signal received from the remote end, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted to the remote end, means whereby the stabilizing current signal acts to prevent opening of the circuit-breaker at such remote end, and means for rendering the operation of a stabilizing relay device effective before the operation of the adjacent tripping relay device.

9. An electric protective arrangement for a section of a sectionalized electric power circuit, comprising a circuit-breaker at each end of the section, a trip circuit for each circuit-breaker, a tripping relay device at each end of the section, each tripping relay device comprising at least one relay operative on the occurrence of a fault on the circuit irrespective of the direction of power flow in the section, two contacts on such relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, means whereby a stabilizing current signal is transmitted to the remote end when a stabilizing relay device operates and a relay of the adjacent tripping relay device closes its lower current setting contact, means at each end operated by the stabilizing current signal from the remote end to open the trip circuit of the adjacent circuit-breaker, and means whereby the trip circuit of each circuit-breaker is closed to cause the opening of the circuit-breaker when a relay of the adjacent tripping relay device closes its higher current setting contact provided that a stabilizing relay has not operated.

10. An electric protective arrangement for a section of a sectionalized electric power circuit, comprising a circuit-breaker at each end of the section, a trip circuit for each circuit-breaker, a tripping relay device at each end of the section, each tripping relay device comprising at least one relay operative on the occurrence of a fault on the circuit irrespective of the direction of power flow in the section, two contacts on such relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, means whereby a stabilizing current signal is transmitted to the remote end when a stabilizing relay device operates and a relay of the adjacent tripping relay device also operates to close its lower current setting contact, means at each end operated by the stabilizing current signal from the remote end to open the trip circuit of the adjacent circuit-breaker, means whereby each tripping relay device when a relay thereof operates to close its higher current setting contact causes the transmission of a tripping current signal to the remote end of the section provided that a stabilizing relay has not operated, and means whereby the trip circuit of each circuit-breaker is closed to cause the opening of the circuit-breaker when a relay of the adjacent tripping relay device operates to close its higher current setting contact and a tripping current signal is received from the remote end.

11. An electric protective arrangement for a section of a sectionalized electric power circuit, comprising a circuit-breaker at each end of the section, a trip circuit for each circuit-breaker, a tripping relay device at each end of the section, each tripping relay device comprising at least one relay having an operating coil energized from the adjacent end of the section in accordance with the current flowing therein, a movable member controlled by the operating coil, two contacts sequentially operated by movement of such member and means whereby a lower current setting is obtained for the operation of the first contact than for the operation of the second contact, a directional stabilizing relay device at each end of the section operative on the occurrence of a fault on the circuit only when power is flowing out from the section at the end adjacent to the stabilizing relay device, means whereby a stabilizing current signal is transmitted to the remote end when a stabilizing relay device operates and a relay of the adjacent tripping relay device also operates to close its first contact, means at each end operated by the stabilizing current signal from the remote end to open the trip circuit of the adjacent circuit-breaker, means whereby each tripping relay device, when a relay thereof operates to close its second contact, causes the transmission of a tripping current signal to the remote end of the section provided that a stabilizing relay has not operated, and means whereby the trip circuit of each circuit-breaker is closed to cause the opening of the circuit-breaker when a relay of the adjacent tripping relay device operates to close its second contact and a tripping current signal is received from the remote end.

12. The combination with a sectionalized electric power circuit, of circuit-breakers for isolating the sections of the power circuit from one another, a trip circuit for each circuit-breaker and means for protecting each section independently of the other sections comprising pilot wires extending between the ends of the section, a tripping relay device at each end of the section, means whereby each tripping relay device when it operates initiates the transmission of a tripping current signal over a pilot wire circuit to the remote end of the section, means whereby the trip circuit of each circuit-breaker is controlled jointly by the operation of the adjacent tripping relay device and the tripping current signal received from the remote end, a directional stabilizing relay device at each end of the section operative on the occurrence of a fault on the circuit only when power is flowing out from the section at the end adjacent to the stabilizing relay device, means whereby each stabilizing relay device when it operates causes a stabilizing current signal to be transmitted over a pilot wire circuit to the remote end, and means whereby the stabilizing current signal acts to prevent the circuit-breaker at such remote end from being opened by the operation of the tripping relay devices.

13. The combination with a sectionalized electric power circuit, of circuit-breakers for isolating the sections of the power circuit from one another, a trip circuit for each circuit-breaker and means for protecting each section independently of the other sections comprising a two-wire pilot circuit extending between the ends of the section, a tripping relay device at each end of the section, a directional stabilizing relay device at each end of the section operative on the occurrence of a fault when power is flowing out from the section at the adjacent end, at least one D.C. source of power at each end, means whereby when both tripping relay devices have operated either a D.C. stabilizing current signal of one polarity or a D.C. tripping current signal of the opposite polarity is caused to flow in the pilot wire circuit in accordance with whether or not a stabilizing relay device has also operated, polarized tripping and stabilizing repeat relays respectively responsive to the tripping and stabilizing current signals and connected in series in the pilot wire circuit at the two ends, and means whereby each circuit-breaker is tripped on operation of the adjacent tripping repeat relay and is prevented from tripping on operation of the adjacent stabilizing repeat relay.

14. The combination with a sectionalized electric power circuit, of circuit-breakers for isolating the sections of the power circuit from one another, a trip circuit for each circuit-breaker and means for protecting each section independently of the other sections comprising a tripping relay device at each end of the section, a directional stabilizing relay at each end of the section operative on the occurrence of a fault only when power is flowing out from the section at the end adjacent to the stabilizing relay device, tripping and stabilizing transmitters of high frequency current at each end respectively responsive to the operation of the tripping and stabilizing relay devices thereat, means for coupling the transmitters to the power circuit whereby the operation of a tripping transmitter causes a high frequency tripping current signal to be transmitted over the power circuit to the other end of the section and the operation of a stabilizing transmitter causes a high frequency stabilizing current signal to be transmitted to the remote end, tripping and stabilizing receivers at each end respectively tuned to the frequencies of the currents transmitted by the tripping and stabilizing transmitters at the remote end, and means whereby each tripping relay device and the adjacent tripping and stabilizing receivers control the trip circuit of the adjacent circuit-breaker, the arrangement being such that when the tripping relay device operates and the tripping receiver is energized by a tripping current signal from the remote end the circuit-breaker is cut out whilst when the stabilizing receiver is energized by a stabilizing current signal from the remote end the circuit breaker is prevented from being cut out.

15. The combination with a sectionalized electric power circuit, of circuit-breakers for isolating the sections of the power circuit from one another, a trip circuit for each circuit-breaker and means for protecting each section independently of the other sections comprising a tripping relay device at each end of the section, a directional stabilizing relay at each end of the section operative on the occurrence of a fault only when power is flowing out from the section at the end adjacent to the stabilizing relay device, tripping and stabilizing transmitters of high frequency current at each end respectively responsive to the operation of the tripping and stabilizing relay devices thereat, the tripping transmitters at the two ends being tuned to transmit at the same frequency as one another and the stabilizing transmitters at the two ends also being tuned to transmit at the same frequency as one another but at a frequency which is different from the frequency of the tripping transmitters, means for preventing operation of a tripping transmitter if the adjacent stabilizing relay device operates, means for coupling the transmitters at one end of the section to one conductor of the power circuit, means for coupling the transmitters at the other end to another conductor of the power circuit so that the high frequency tripping and stabilizing current signals transmitted from one end are superimposed on a conductor other than that utilized for transmitting the corresponding signals from the other end, tripping and stabilizing receivers at each end respectively tuned to the tripping and stabilizing current frequencies of the transmitters, means for coupling the receivers at each end to that conductor of the power circuit to which the transmitters at the other end are coupled, and means whereby each tripping relay device and the adjacent tripping and stabilizing receivers control the trip circuit of the adjacent circuit-breaker, the arrangement being such that when the tripping relay device operates and the tripping receiver is energized by a tripping current signal from the remote end the circuit-breaker is cut out whilst when the stabilizing receiver is energized by a stabilizing current signal from the remote end the circuit-breaker is prevented from being cut out.

16. An electric protective arrangement for a section of a sectionalized electric power circuit comprising a circuit-breaker at each end of the section, a trip circuit for each circuit-breaker, three series-connected contacts in each trip circuit of which two are normally open and the third is normally closed, a tripping relay device at each end of the section, each tripping relay device comprising at least one relay operative on the occurrence of a fault on the circuit irrespective of the direction of power flow in the section, two contacts on each relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, means whereby a stabilizing current signal is transmitted to the remote end when a stabilizing relay device operates and a relay of the adjacent tripping relay device also operates to close its lower current setting contact, means whereby the operation of a relay of a tripping relay device to close its higher current setting contact causes the transmission of a tripping current signal to the remote end of the section provided that a stabilizing relay has not operated and also causes the closing of one of the normally open contacts in the trip circuit at the adjacent end, means whereby a tripping current signal received from the remote end causes the closing of the other normally open contact in the trip circuit at said adjacent end and means whereby a stabilizing current signal received from the remote end causes the opening of the normally closed contact in the trip circuit at said adjacent end.

17. The combination with a sectionalized electric power circuit, of circuit-breakers for isolating the sections of the power circuit from one another, a trip circuit for each circuit-breaker, and means for protecting each section independently of the other sections comprising a two-wire pilot circuit extending between the ends of the section, a tripping relay device at each end of the section, each tripping relay device comprising at least one relay operative on the occurrence of a fault on the circuit irrespective of the direction of power current flow in the section, two contacts on each relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, a polarized tripping and stabilizing repeat relay connected in series in the pilot wire circuit at each end of the section, a normally-closed contact on each repeat relay adapted to be opened when the relay is energized by a current flowing in one direction, a normally-open contact on each repeat relay adapted to be closed when the relay is energized by current flowing through it in the other direction, an auxiliary tripping relay at each end of the section controlled by the adjacent tripping relay device so that it is operated when a relay of the said device closes its higher current setting contact provided that the adjacent stabilizing relay device has not operated, a normally open contact on said auxiliary tripping relay connected in series with the two contacts of the adjacent repeat relay in the trip circuit of the adjacent circuit-breaker, means whereby a stabilizing current signal is transmitted over the pilot wire circuit in a direction to cause the repeat relays to open their normally closed contacts when a stabilizing relay device operates and a relay of the tripping relay device at the adjacent end closes its lower current setting contact, and means whereby a tripping current signal is transmitted over the pilot wire circuit to cause the repeat relays to close their normally open contacts when an auxiliary tripping relay operates its higher current setting contact provided that the stabilizing relay device at the remote end has not operated.

18. The combination with a sectionalized electric power circuit, of circuit-breakers for isolating the sections of the power circuit from one another, a trip circuit for each circuit-breaker and means for protecting each section independently of the other sections comprising two pilot wires extending between the ends of the section, a directional tripping relay device at each end of the section operative on the occurrence of a fault on the circuit only when power is flowing into the section at the end adjacent to the tripping relay device, a directional stabilizing relay device at each end of the section operative on the occurrence of a fault on the circuit only when power is flowing out from the section at the adjacent end, a tripping and stabilizing repeat relay at each end, each repeat relay having a normally closed contact, a normally-open contact connected in series with the normally-closed contact and means whereby a lower current setting is obtained for the operation of the normally-closed contact than for the operation of the normally-open contact and the repeat relay at one end being connected in series with one pilot wire and the repeat relay at the other end in series with the other pilot wire, an auxiliary tripping relay at each end, a normally-open contact on said auxiliary relay connected in series with the contacts of the adjacent repeat relay in the trip circuit of the adjacent circuit-breaker, means whereby the operation of a stabilizing relay device causes a stabilizing current signal to be transmitted over the pilot wire with which the repeat relay at the remote end is connected in series this current being only sufficient to cause this relay to open its normally closed lower current setting contact, and means whereby the operation of a tripping relay device causes the adjacent auxiliary tripping relay to be operated and a tripping current signal to be transmitted over the pilot wire to the repeat relay at the remote end, this current being sufficient to cause the repeat relay to close its normally-open higher current setting contact.

19. An electric protective arrangement for a section of a sectionalized electric power circuit, comprising a circuit-breaker at each end of the section, a trip circuit for each circuit-breaker a tripping relay device at each end of the section, each tripping relay device comprising at least one relay operative on the occurrence of a fault on the circuit irrespective of the direction of power flow in the section, two contacts on each relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, tripping and stabilizing transmitters of high frequency current at each end respectively associated with the tripping and stabilizing relay devices thereat, means for coupling the transmitters to the power circuit whereby on the operation of a transmitter at one end of the section a high frequency tripping or stabilizing current signal is superimposed on the power circuit and transmitted to the remote end, tripping and stabilizing receivers at each end respectively tuned to the frequencies of the currents transmitted by the tripping and stabilizing transmitters at the remote end, means whereby a stabilizing transmitter transmits a stabilizing current signal to the remote end when the adjacent stabilizing relay device operates and a relay of the adjacent tripping relay device also operates to close its lower current setting contact, means whereby a tripping transmitter transmits a tripping current signal to the remote end when a relay of the adjacent tripping relay device operates to close its higher current setting contact provided that the adjacent stabilizing relay device has not operated, and means whereby each tripping relay device and the adjacent tripping and stabilizing receivers control the trip circuit of the adjacent circuit-breaker, the arrangement being such that when the tripping relay device operates and the tripping receiver is energized by a tripping current signal from the remote end the circuit-breaker is cut out whilst when the stabilizing receiver is energized by a stabilizing current signal from the remote end the circuit-breaker is prevented from being cut out.

20. An electric protective arrangement for a section of a sectionalized electric power circuit, comprising a circuit-breaker at each end of the section, a trip circuit for each circuit-breaker, a tripping relay device at each end of the section, each tripping relay device comprising at least one relay having an operating coil energized from the adjacent end of the section in accordance with the current flowing therein, a movable member controlled by the operating coil, two contracts sequentially operated by movement of such member, means for applying an additional force opposing movement of the contact-operating member to the said member after operation of the first contact whereby a lower current setting is obtained for the operation of the first contact than for the operation of the second contact and means for varying independently the current settings of the two contacts, a directional stabilizing relay device at each end of the section operative on the occurrence of a fault on the circuit only when power is flowing out from the section at the end adjacent to the stabilizing relay device, means whereby when a stabilizing relay device operates and a relay of the adjacent tripping relay device also operates to close its first contact a stabilizing current signal is transmitted to the remote end, means whereby the stabilizing current signal prevents tripping of the circuit-breaker at such remote end, means whereby each tripping relay device when a relay thereof operates to close its second contact causes the transmission of a tripping current signal to the remote end of the section provided that the adjacent stabilizing relay device has not operated, and means whereby the trip circuit of each circuit-breaker is closed to trip the circuit-breaker when a relay of the adjacent tripping relay device operates to close its second contact and a tripping current signal is received from the remote end.

21. The combination with a sectionalized electric power circuit, of circuit-breakers for isolating the sections of the power circuit from one another, a trip circuit for each circuit-breaker, and means for protecting each section independently of the other sections comprising a two-wire pilot circuit extending between the end of the section, a tripping relay device at each end of the section, each tripping relay device comprising at least one relay operative on the occurrence of a fault on the circuit irrespective of the direction of power current flow in the section two contacts on each relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, a polarized tripping and stabilizing repeat relay connected in series in the pilot wire circuit at each end of the section, a normally-closed contract on each repeat adapted to be opened when the relay is energized by a current flowing in one direction, a normally-open contact on each repeat relay adapted to be closed when the relay is energized by current flowing through it in the other direction, an auxiliary tripping relay at each end of the section controlled by the adjacent tripping relay device so that it is operated when a relay of the said device closes its higher current setting contact provided that the adjacent stabilizing relay device has not operated, a normally-open contact on said auxiliary tripping relay connected in series with the two contacts of the adjacent repeat relay in the trip circuit of the adjacent circuit-breaker, means whereby a stabilizing current signal is transmitted over the pilot wire circuit in a direction to cause the repeat relays to open their normally closed contacts when a stabilizing relay device operates and a relay of the tripping relay device at the adjacent end closes its lower current setting contact, means whereby a tripping current signal is transmitted over the pilot wire circuit to cause the repeat relays to close their normally open contacts when an auxiliary tripping relay operates provided that the stabilizing relay device at the remote end has not operated, and means whereby each tripping relay device is operative after a short time delay to complete the trip circuit of the adjacent circuit-breaker independently of the tripping relay device at the remote end provided that a stabilizing current signal has not meanwhile been received from such remote end.

22. An electric protective arrangement for a section of a sectionalized electric power circuit comprising a circuit-breaker at each end of the section, a trip circuit for each circuit-breaker, a two-wire pilot circuit extending between the ends of the section, a tripping relay device at each end of the section, each tripping relay device comprising at least one relay operative on the occurrence of a fault on the section irrespective of the direction of power flow in the section, two contacts on each relay and means whereby a lower current setting is obtained for the operation of one contact than for the operation of the other contact, a directional stabilizing relay device at each end of the section operative on the occurrence of a fault on the circuit only when power is flowing out from the section at the end adjacent to the stabilizing relay device, a D.C. source of current at each end of the section, means whereby said source is connected to the pilot wire circuit to transmit a stabilizing current signal flowing in one direction round the circuit when the adjacent stabilizing relay device operates and a relay of the adjacent tripping relay device operates to close its lower current setting contact, a second D.C. source of current at each end of the section having a voltage which is less than that of the first source, means whereby said source is connected to the pilot wire circuit to transmit a tripping current signal flowing in the other direction round the circuit when a relay of the adjacent tripping relay device operates to close its higher current setting contact provided that a stabilizing relay device has not operated, the difference in the voltages of the two sources being such that when a first source is connected to the pilot wire circuit at one end and a second source to the circuit at the other end a stabilizing current signal flows in such circuit, polarized tripping and stabilizing repeat relays at the two ends of the section and means whereby a tripping current signal flowing in the pilot wire circuit causes the operation of repeat relays to effect tripping of the circuit-breakers at the two ends and a stabilizing current signal flowing in the pilot wire circuit causes operation of repeat relays to prevent tripping of the said circuit breakers.

HENRY WILLIAM CLOTHIER.
BRUCE HAMER LEESON.
HENRY LEBEN.